US007327216B2

(12) United States Patent
Ghabra et al.

(10) Patent No.: US 7,327,216 B2
(45) Date of Patent: Feb. 5, 2008

(54) SECRET KEY PROGRAMMING TECHNIQUE FOR TRANSPONDERS USING ENCRYPTION

(75) Inventors: Riad Ghabra, Dearborn Heights, MI (US); Gurpreet Singh, Southgate, MI (US)

(73) Assignee: Lear Corporation, Southfield, MI (US)

( * ) Notice: Subject to any disclaimer, the term of this patent is extended or adjusted under 35 U.S.C. 154(b) by 491 days.

(21) Appl. No.: 11/090,267

(22) Filed: Mar. 28, 2005

(65) Prior Publication Data

US 2006/0214766 A1 Sep. 28, 2006

(51) Int. Cl.
*H04Q 1/00* (2006.01)
*G05B 19/00* (2006.01)

(52) U.S. Cl. ................. 340/5.26; 340/10.51; 340/5.25; 340/5.26; 380/277; 713/182; 713/189; 235/382.5

(58) Field of Classification Search ............ 340/10.51, 340/5.25, 5.26; 380/277; 713/182, 189; 235/382.5
See application file for complete search history.

(56) References Cited

U.S. PATENT DOCUMENTS

| | | | | |
|---|---|---|---|---|
| 4,763,305 | A | 8/1988 | Kuo | |
| 6,160,488 | A | 12/2000 | Honda | |
| 6,243,022 | B1 | 6/2001 | Furukawa | |
| 6,737,955 | B2 | 5/2004 | Ghabra et al. | |
| 6,747,546 | B1 * | 6/2004 | Hikita et al. | 340/10.31 |
| 2002/0049904 | A1 | 4/2002 | Nowottnick et al. | |
| 2006/0208069 | A1 * | 9/2006 | Gilbert et al. | 235/382.5 |

FOREIGN PATENT DOCUMENTS

| | | |
|---|---|---|
| EP | 0347893 | 12/1989 |
| EP | 0805575 | 11/1997 |
| GB | 2202354 | 9/1988 |

OTHER PUBLICATIONS

Integrated Circuits, HT2DC20S20, HITAG 2 stick transponder, Data Sheet, Hitag, Philips, Oct. 1, 2001, pp. 1-15.
HT1 Transponder Family, Communication Protocol, Reader HITAG™ 1 Transponder, Data Sheet, Philips, Sep. 1997, pp. 1-42.
HT2 Transponder Family, Communication Protocol, Reader HITAG™ 2 Transponder Data Sheet, Philips, Oct. 1997, pp. 30.

* cited by examiner

*Primary Examiner*—Nick Corsaro
*Assistant Examiner*—Omer S Khan
(74) *Attorney, Agent, or Firm*—MacMillan, Sobanski & Todd, LLC

(57) ABSTRACT

A secret key is programmed into a key transponder from a base station wherein the key transponder stores a fixed ID, a first default key segment stored in a first memory page, and a second default key segment stored in a second memory page. The secret key comprises a first new secret key segment to be stored in the first memory page of the key transponder and a second new secret key segment to be stored in the second memory page of the key transponder. A mutual authentication process is initially conducted using the default key. Write commands are sent to the key transponder in transferring each key segment. Write acknowledgement signals and confirmatory reading back of the data are employed for ensuring proper storage of the secret key. Recovery from the most probable types of errors enables successful programming of key transponders in an efficient manner with a low loss rate.

15 Claims, 4 Drawing Sheets

SECRET KEY PROGRAMMING TECHNIQUE FOR TRANSPONDERS USING ENCRYPTION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to vehicle electronic security systems, and, more specifically, to a method and apparatus for programming a secret key into a key transponder unit in a robust manner that avoids partially programmed transponders being left in an undetermined state which results in the scrapping of the transponder units.

Specially coded electronic transponders have been used as part of vehicle security systems to help ensure that access to the vehicle and/or starting of a vehicle engine is limited to a person carrying a transponder that is recognized by the vehicle. In one common form, a passive anti-theft system embeds a transponder in the head of a vehicle ignition key. When the key is turned in a lock in order to crank the vehicle engine, an electronic reader interrogates the transponder for a unique identification code that has been previously programmed into the reader. If the correct code is received, then the vehicle is allowed to start. The same key-mounted transponder can also be used in connection with a passive entry system that controls door locks in response to communication between a vehicle base station and the transponder. The transponder may alternatively be mounted in a fob which also functions as a remote keyless entry (RKE) transmitter or in any other device to be carried by a user.

In order to avoid placing a power source such as a battery into the key head, a passive (i.e., batteryless) transponder capable of being charged electromagnetically by the reader has been employed. A charge pulse coupled from the reader to the transponder pumps up a charge on a capacitor that then supplies power to allow the transponder to transmit its identification code to the reader.

The earliest passive anti-theft systems transmitted information only in one direction (i.e., from the transponder to the reader). One potential vulnerability of such systems involves the cloning by an unauthorized person of the identification code into the transponder of another key unit. In this scenario, the unauthorized person obtains temporary possession of the legitimate key (e.g., at a valet parking service or during servicing of the vehicle at a repair shop) and interrogates it with a reader that then saves the identification code for later programming into another transponder. This facilitates stealing the vehicle at a later time.

To prevent such cloning of a transponder's code, systems with two-way communication have been introduced wherein the vehicle reader must authenticate to the electronic key before the electronic key will transmit the unique password that gains access to or starts the vehicle. The two-way (i.e., mutual) authentication increases security and eliminates the ability of a potential thief to learn the secret transponder password without first knowing a unique, secret code used for encrypting communications which is given to the key transponder by the base station (e.g., vehicle reader or factory programming unit) during programming. Thus, a typical communication sequence of the security system involves 1) the electronic key providing an unprotected, freely-given ID code to the reader, 2) the reader using a secret encryption algorithm and a secret key to generate encrypted secret data and then sending it to the key transponder, 3) the key transponder decrypting the data using the secret key and comparing it to stored data, 4) if the decryption produces a successful match, then the key transponder sending its secret password to the reader, and 5) the reader comparing the secret password with its stored value for authorized keys with the ID code identified in step 1 and granting vehicle access accordingly. Typically, the secret encryption key is unique to a particular vehicle and the vehicle uses the same secret key on each of its programmed electronic keys. Alternatively, more than one secret encryption key could be used by a vehicle to distinguish between different key transponders.

It is very important that the programming of a key transponder be very robust in the sense that when attempting to write a new secret encryption key it must be accurately copied into the transponder memory in full. Any errors or malfunctions that cause only partial writing of a secret key can lead to an undeterminable value being stored in the transponder, thereby making it impossible to communicate further with the transponder. The secret code is typically several bytes long (most typically 6 bytes or 48 bits) and is stored in an electrically erasable programmable read only memory (EEPROM) in the transponder. An EEPROM is usually organized into separately addressable pages which are shorter than the length of the secret key (e.g., pages of 4 bytes). The pages must be written separately by issuing separate write commands to the transponder. The amount of time required for multiple write operations increases the risk that transient conditions will disrupt proper storing of the desired data. Various circumstances such as inadvertent removal of the electronic key from the reader/programmer before programming is completed, a power interruption during programming, or radio interference during programming can result in interruption of the process of writing a new secret key. Programming in a vehicle assembly plant by the manufacturer is especially problematic because it is hard to maintain low electrical noise in the vicinity of the reader/programmer, for example.

SUMMARY OF THE INVENTION

The present invention has the advantage of programming a secret key into a key transponder unit in a robust manner that avoids partially programmed transponders in an undetermined state which results in the scrapping of the transponder units. In one aspect of the invention, a method of programming a secret key into a key transponder from a base station is provided wherein the key transponder stores a fixed ID, a first default key segment stored in a first memory page, and a second default key segment stored in a second memory page. The secret key comprises a first new secret key segment to be stored in the first memory page of the key transponder and a second new secret key segment to be stored in the second memory page of the key transponder. A mutual authentication process is conducted using a first default key segment and a second default key segment. A first write command is sent identifying the first memory page. A check for a first acknowledgement signal from the key transponder is made. If the first acknowledgement signal is not detected, then the method returns to the step of conducting a mutual authentication process using the first default key segment and the second default key segment. If the first acknowledgement signal is detected, then a first read command identifying the first memory page is sent. If no read data is detected in response to the first read command, then the method returns to the step of conducting a mutual authentication process using the first default key segment and the second default key segment. If correct read data is detected in response to the first read command, then a second write command identifying the second memory page is sent. A check for a second acknowledgement signal from the key transponder is made. If the second acknowledgement signal is not detected, then a mutual authentication process is conducted using the first new secret key segment and the second default key segment and the method returns to the step of sending a second write command. If the second acknowledgement signal is detected, then a second read command identifying the second memory page is sent. If no read data is detected in response to the second read command, then the method returns to the step of conducting a mutual authentication process using the first new secret key segment and the second default key segment. If correct read data is detected in response to the second read command, then the base station associates the fixed ID of the key transponder with the first and second new secret key segments.

DETAILED DESCRIPTION OF PREFERRED EMBODIMENTS

Figure 1:
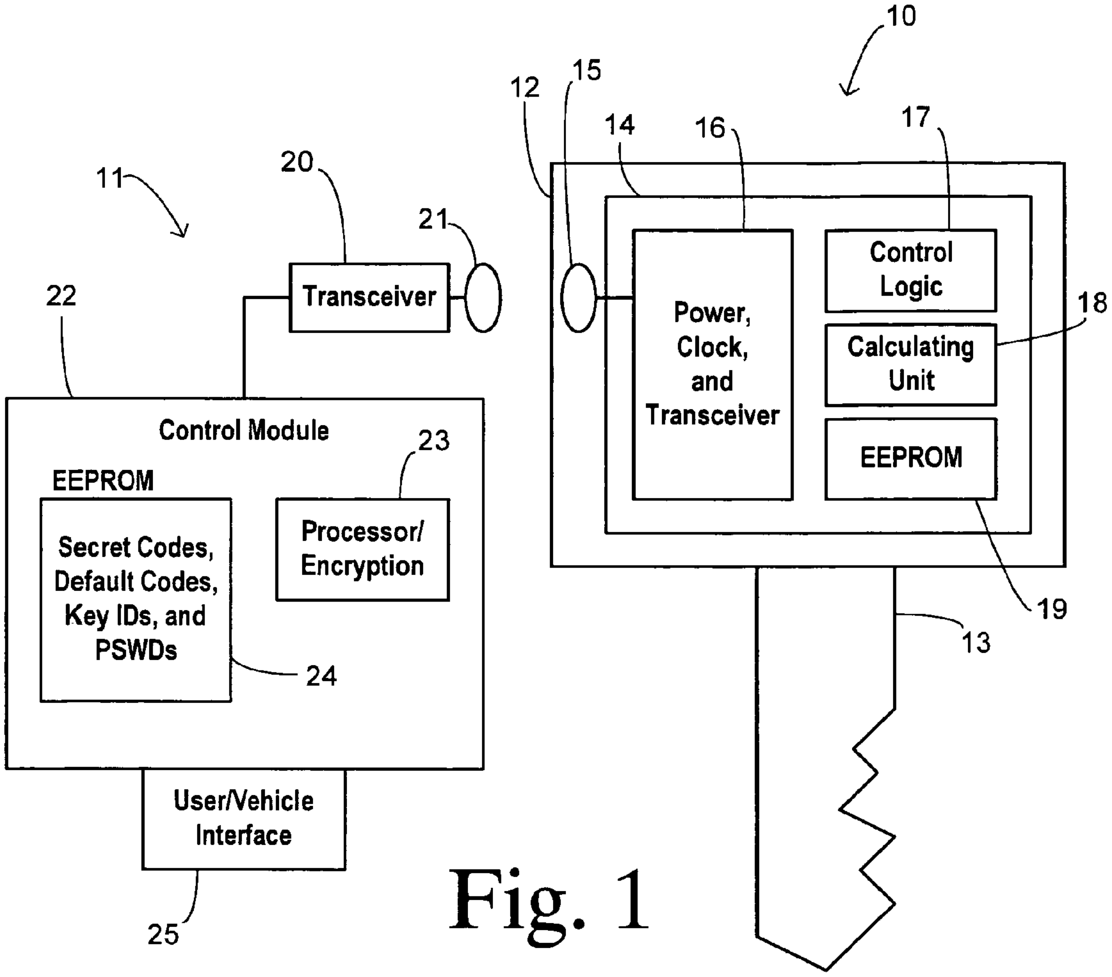
FIG. 1 is a block diagram showing an electronic key transponder unit and reader/programmer according to the present invention.

Referring now to FIG. 1, an electronic key transponder unit 10 communicates with a base station 11 that acts as a reader. Electronic key 10 includes a key head 12 having embedded electronic components (e.g., a transponder 14) and joined to the end of a key shank 13 for fitting into an ignition lock. Transponder 14 includes an antenna 15 and several functional blocks including a power, clock, and transceiver block 16, a control logic block 17, a calculating unit 18, and an EEPROM 19. Transponder 14 may comprise any suitable commercially available transponder for RF tagging and security applications, such as a hitag™ manufactured by Philips Semiconductors or a Transponder DST+ or a Controller Entry Transponder IC TMS37C136, both manufactured by Texas Instruments Incorporated, for example.

Since transponder 14 is batteryless, block 16 develops an operating voltage in response to RF energy broadcast by base station 11. Clock recovery, demodulation or incoming signals, and modulation of outgoing signals are also performed by block 16. Control logic 17 is programmed to coordinate communication, device authentication, and other functions. All but some preliminary communications are conducted using encryption of commands and data. Calculation unit 18 performs the manipulations related to encrypting and decrypting messages. EEPROM 19 allows for personalization of each key transponder and is organizes as a plurality of separately addressable memory pages each including a plurality of bytes as described below.

Base station 11 includes a transceiver 20 coupled to an antenna 21 and to a control module 22. Antennas 21 and 15 are brought into close proximity for charging the transponder and carrying on wireless two-way communication (typically at a frequency of about 125 kHz and/or 134 kHz). Control module 22 includes an EEPROM 24 for storing default key codes, secret key codes, key IDs, and key passwords. The specific contents of EEPROM 24 depend upon whether base station 11 is mounted in a vehicle as part of an electronic security system or whether it is in a device for programming keys for vehicles in a manufacturing plant or in a service garage. Likewise, a processor/encryption block 23 preferably includes program instructions specifically adapted to communicating with and configuring electronic key transponders in either the context of a vehicle base station or that of a manufacturing or service programming tool. A user/vehicle interface 25 may include control inputs (such as an activation switch for initiating the programming of an electronic key), feedback elements (such as an indicator light to show when an attempted programming of an electronic key has failed), and power and communication busses for interfacing with other electronics.

Figure 2:
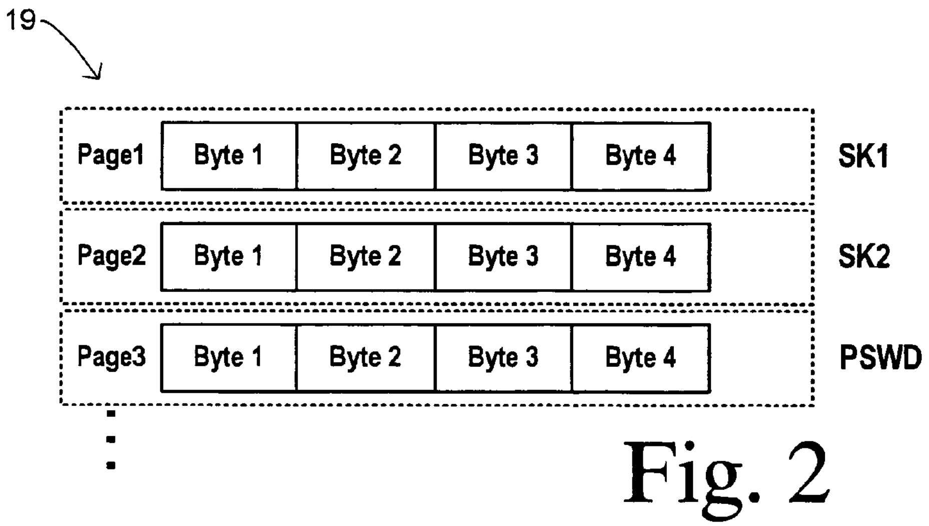
FIG. 2 shows the contents of several memory pages in a key transponder.

A preferred memory organization and usage is shown in FIG. 2. A secret key (used as one parameter for a known encryption algorithm) of the preferred embodiment typically contains six 8-bit bytes, resulting in 48 bits for the secret key. Page l includes the least significant four bytes which are referred to herein as a first secret key segment SK1. Page 2 includes the most significant two bytes (e.g., in its Byte 1 and Byte 2) which are referred to herein as a second secret key segment SK2. Page 3 includes a secret password PSWD which is given out by the key transponder only after a successful authentication. The values for SK1, SK2, and PSWD are rewritable so that the key transponder can be customized or personalized to a particular vehicle for security purposes. A transponder is typically delivered from its original manufacturer with default secret key values that are made known to the purchaser so that authenticated access and subsequent customizing of the key values and password can be performed. During programming, a first default key segment stored at SK1 is changed to a first new secret code segment having a value determined by the vehicle manufacturer, for example. Likewise, a second default key segment stored at SK2 is changed to a second new secret code segment and a new password value is written for PSWD. A fixed ID code (not shown) is also stored in the key transponder which is shared freely at the beginning of the authentication process without encryption.

A typical authentication process proceeds as follows. The reading device (e.g., vehicle base station or factory programming base station) produces an energizing field for a predetermined period of time to build up an operating voltage within the key transponder. Once the transponder is sufficiently charged, the base station sends a "start authentication" command according to a defined protocol. Each command of the protocol may comprise a respective combination of binary bits transmitted using any desired type of modulation and encoding (e.g., amplitude shift keying and Manchester encoding). In response to detecting the start command, the transponder (i.e., the tag) transmits a start bit sequence (e.g., "11111") followed by its fixed ID serial number (e.g., a 32-bit unique number assigned at manufacture). Using the ID serial number, the base station can check the purported identity of the transponder (e.g., a vehicle base station can check whether the key transponder is one claiming to have been recorded as an authorized device to access or control the vehicle before going on to complete the authentication procedure). Using the current value for the secret key that the base station “believes” is present within the transponder, the base station generates some secret encrypted data. For example, the base station may generate a pseudo-random number, encrypt it using a shared encryption algorithm and the secret key, and then transmit both the number and the encrypted version to the transponder. Based on the secret key and encryption algorithm stored in the transponder, it decrypts the encrypted number and compares it with the random number. If the two are equal, then the identity of the vehicle base station is verified since the base station must possess the appropriate secret key and shared algorithm. In consequence, the transponder transmits its password (in encrypted form) to be verified by the base station. Once the mutual authentication is complete, the transponder is open for other encrypted commands and encrypted data from the base station.

Figure 3:
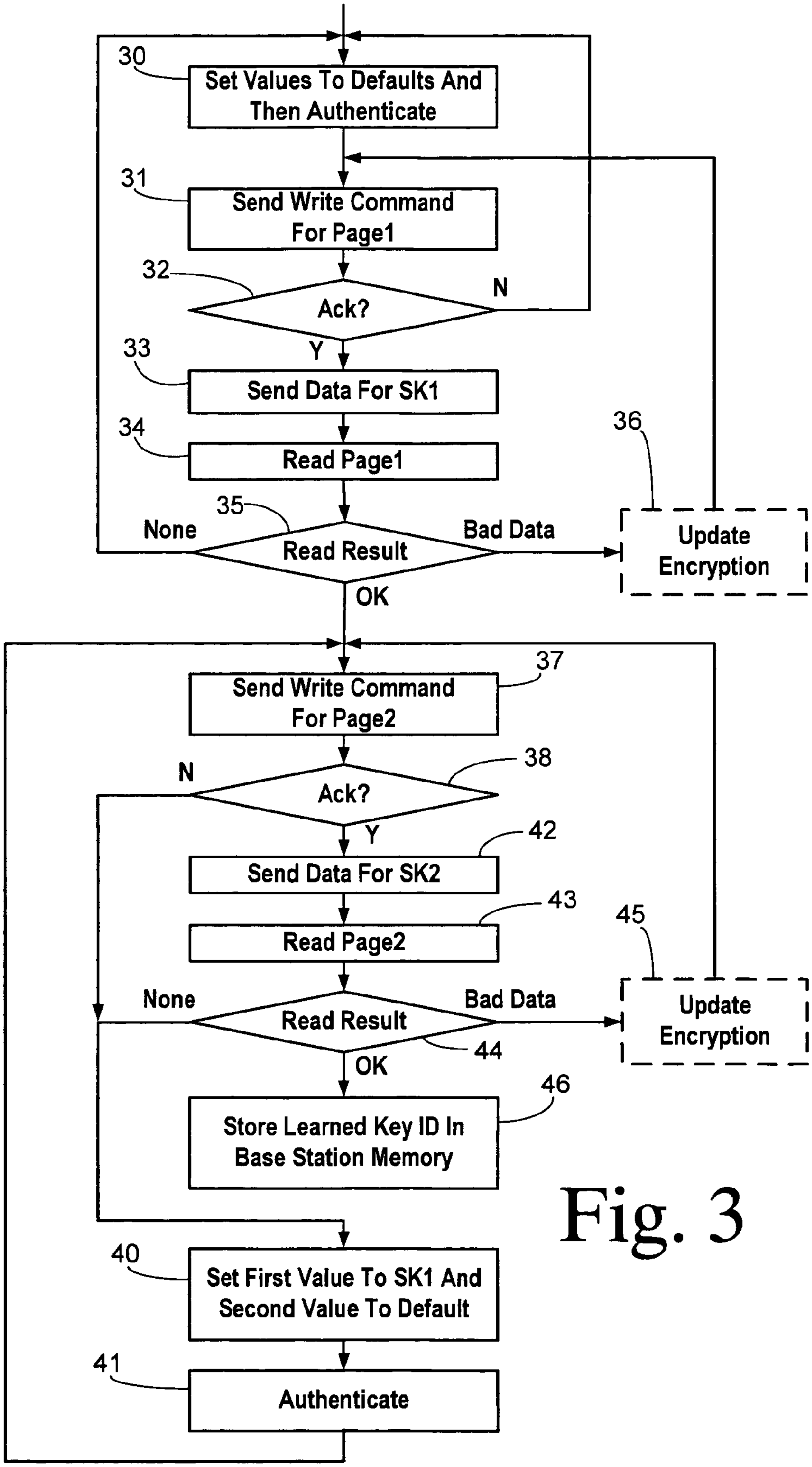
FIG. 3 is a flowchart showing a first preferred method of the invention.

A first embodiment of a method for writing new secret key segments to a transponder is shown in FIG. 3. In step 30, values for the secret key segments are set to default values in the reader/programmer (e.g., values corresponding to the default values programmed into a key transponder by the manufacturer), and then the authentication process is conducted so that the key transponder will be open to processing further commands. In step 31, a write command is sent providing the address for Page 1 as the write destination. A check is made in step 32 for an acknowledgement from the key transponder (i.e., a reflection response signal which typically comprises start bits followed the write command and the address contained in the write command so that the reader/programmer can confirm accurate receipt of its command). If there is no acknowledgement, then a return is made to step 30 to attempt a re-authentication and a second attempt to transmit the write command. It may be desirable to monitor the number of times that an acknowledgement signal is not detected and to discard a key as unusable after a predetermined number of failures.

If a valid acknowledgement is received in step 32, then the reader/programmer sends the new data for the first secret key segment SK1. It should be noted that the order of the acknowledgement signal within the sequence of sending a write command and sending data is not critical (i.e., the acknowledgement could also follow the sending of the data). In order to confirm that data is properly written in the present embodiment, a read command is sent in step 34 to read out the contents of Page 1 from the key transponder to the reader/programmer. Step 35 checks the read result. If there is no read data received, then a return is made to step 30 in order to re-authenticate with the default values for the secret key segments. If bad data is received (i.e., confirmation data from the key transponder does not match the data sent), then a return is made to step 31 to rewrite the data. In the event that the key transponder uses a rolling encryption wherein the encryption value changes for each transmission or exchange between the key transponder and reader/programmer, then the encryption values are updated in step 36 prior to returning to step 31.

If correct data is read in step 35, then a write command is sent for the second page of memory Page 2 for containing the second secret key segment in step 37. If a check for an acknowledgement in step 38 fails to detect the acknowledgement signal, then a second try to write a new secret key segment SK2 is initiated in step 40. In order to re-authenticate, the first key segment value is set to SK1 and the second value is set to the default. As a result, the secret key values match those stored in the key transponder since the first page has already been correctly rewritten but the second has not. Using these mixed values, a mutual authentication process is performed in step 41 prior to returning to step 37. If a correct acknowledgement signal is received in step 38, then the new values for SK2 are sent in step 42 and correct data is confirmed by sending a read command in step 43. The read result is checked in step 44. If no response is received to the read command, then an attempt to re-authenticate is made beginning at step 40. If bad data is received, then encryption may be updated in step 45 (if necessary) and then a return is made to step 37. If correct data is read, then the key transponder has been successfully programmed. In step 46, the fixed ID of the key transponder is stored as a learned key in the memory of the base station. If the reader/programmer being used is a factory tool and not the actual base station in the corresponding vehicle, then the fixed key ID and the new secret key values SK1 and SK2 are downloaded to the vehicle base station in step 46.

Figure 4:
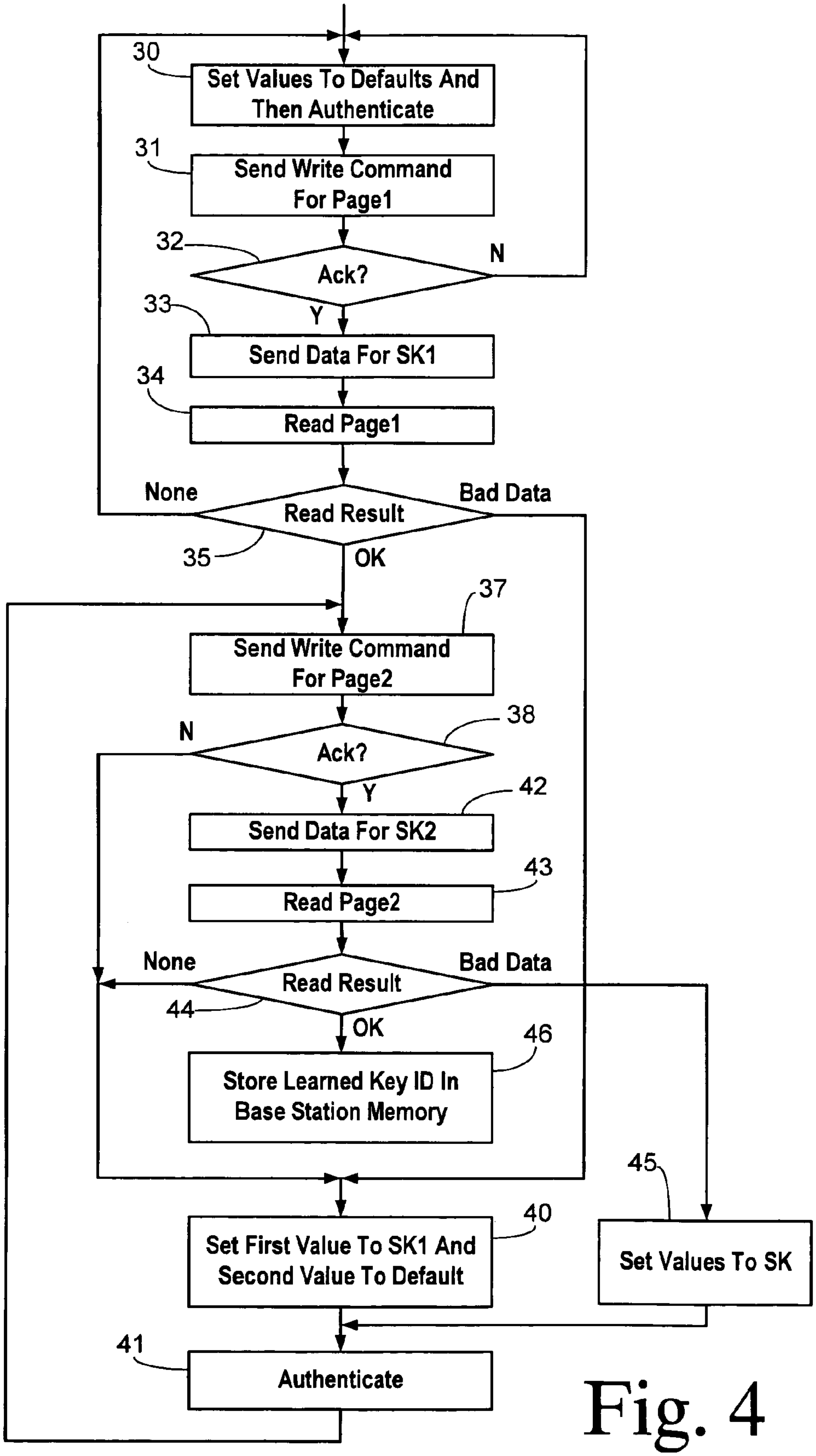
FIG. 4 is a flowchart showing another preferred embodiment of a method of the invention.

FIG. 4 shows an alternative embodiment based on a simplifying assumption that in the event that bad data is received when reading newly written data back out from the key transponder then the error probably occurred during the read operation rather than the write operation. Thus, in step 35 if the read result shows bad data from the reading of Page 1, then rather than attempting to rewrite the first key segment, this alternate method moves on to writing the second new key segment. However, before attempting the second write command this alternative embodiment re-authenticates in steps 40 and 41 since the bad read result may be associated with a loss of encryption.

If the second read command determines resulting bad data associated with the second write command, then a re-authentication using both new values SK1 and SK2 for the secret key is conducted in order to ensure that in fact both new values were properly written. Thus, the secret key values are set to their new values in step 45 prior to re-authenticating in step 41. The second key segment is rewritten beginning at step 37 so that the write operation can be successfully confirmed and the base station updated.

Figure 5:
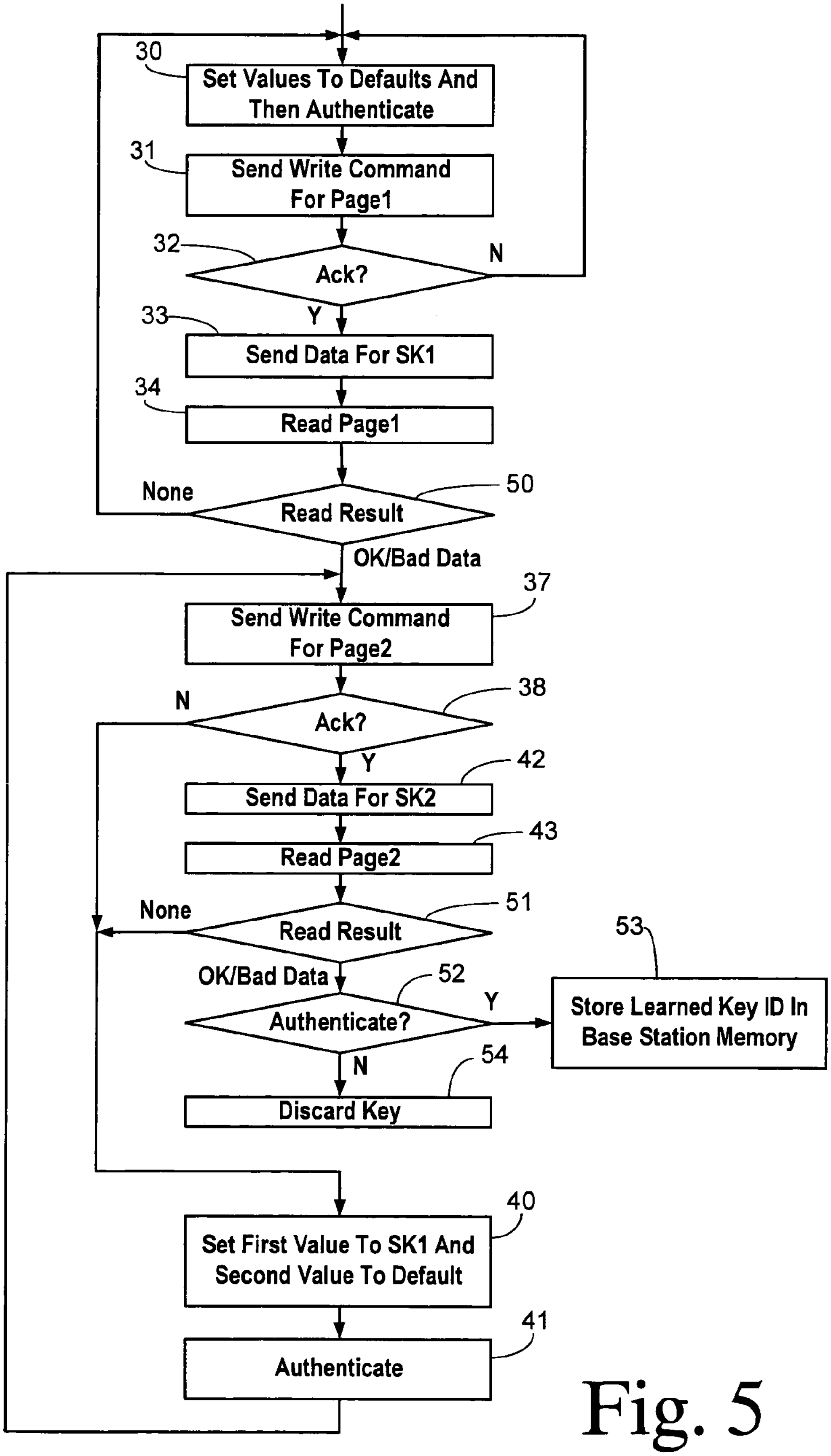
FIG. 5 is a flowchart showing yet another preferred method of programming a secret key into a key transponder.

FIG. 5 shows another alternative embodiment wherein bad data is treated as the same result as though correct data was written. Thus, any return data sent by the key transponder in response to a read command is accepted (i.e., only the presence of data is detected rather than detecting a match of the data). In order to ensure a functional key transponder, a final re-authentication using the new secret key is performed after the second read command in step 52. If a successful authentication is performed in step 52, then the base station memory is updated in step 53. If mutual authentication fails in step 52, then the key transponder is discarded in step 54 since incorrect data was probably written into the key transponder making it difficult and costly to recover.

What is claimed is:

1. A method of programming a secret key into a key transponder from a base station, wherein said key transponder stores a fixed ID, a first default key segment stored in a first memory page, and a second default key segment stored in a second memory page, and wherein said secret key comprises a first new secret key segment to be stored in said first memory page of said key transponder and a second new secret key segment to be stored in said second memory page of said key transponder, said method comprising the steps of:

conducting a mutual authentication process using a first default key segment and a second default key segment;

sending a first write command identifying said first memory page;

checking for a first acknowledgement signal from said key transponder;

if said first acknowledgement signal is not detected, then returning to said step of conducting a mutual authentication process using said first default key segment and said second default key segment;

if said first acknowledgement signal is detected, then sending a first read command identifying said first memory page;

if no read data is detected in response to said first read command, then returning to said step of conducting a mutual authentication process using said first default key segment and said second default key segment;

if correct read data is detected in response to said first read command, then sending a second write command identifying said second memory page;

checking for a second acknowledgement signal from said key transponder;

if said second acknowledgement signal is not detected, then conducting a mutual authentication process using said first new secret key segment and said second default key segment and returning to said step of sending a second write command;

if said second acknowledgement signal is detected, then sending a second read command identifying said second memory page;

if no read data is detected in response to said second read command, then returning to said step of conducting a mutual authentication process using said first new secret key segment and said second default key segment;

if correct read data is detected in response to said second read command, then said base station associating said fixed ID of said key transponder with said first and second new secret key segments.

2. The method of claim 1 further comprising the steps of:

sending said first new key segment to said key transponder in response to said first acknowledgement signal and prior to said first read command; and sending said second new key segment to said key transponder in response to said second acknowledgement signal and prior to said second read command.

3. The method of claim 1 further comprising the step of:

if incorrect data is detected in response to said first read command, then returning to said step of sending said first write command.

4. The method of claim 3 further comprising the step of:

if incorrect data is detected in response to said second read command, then returning to said step of sending said second write command.

5. The method of claim 4 wherein communication between said base station and said key transponder is encrypted using rolling encryption after said mutual authentication process, said method further comprising the steps of:

updating said rolling encryption prior to returning to said step of sending said first write command; and updating said rolling encryption prior to returning to said step of sending said second write command.

6. The method of claim 1 further comprising the step of:

if incorrect data is detected in response to said first read command, then conducting a mutual authentication process using said first new secret key segment and said second default key segment before sending said second write command.

7. The method of claim 1 further comprising the step of:

if incorrect data is detected in response to said second read command, then conducting a mutual authentication process using said first new secret key segment and said second new secret key segment and then returning to said step of sending said second write command.

8. A base station for programming a secret key into a key transponder, wherein said key transponder stores a fixed ID, a first default key segment stored in a first memory page, and a second default key segment stored in a second memory page, and wherein said secret key comprises a first new secret key segment to be stored in said first memory page of said key transponder and a second new secret key segment to be stored in said second memory page of said key transponder, said base station comprising:

a transceiver for wirelessly communicating with said key transponder; and a controller programmed to perform the steps of:

conducting a mutual authentication process using a first default key segment and a second default key segment;

sending a first write command identifying said first memory page;

checking for a first acknowledgement signal from said key transponder;

if said first acknowledgement signal is not detected, then returning to said step of conducting a mutual authentication process using said first default key segment and said second default key segment;

if said first acknowledgement signal is detected, then sending a first read command identifying said first memory page;

if no read data is detected in response to said first read command, then returning to said step of conducting a mutual authentication process using said first default key segment and said second default key segment;

if correct read data is detected in response to said first read command, then sending a second write command identifying said second memory page;

checking for a second acknowledgement signal from said key transponder;

if said second acknowledgement signal is not detected, then conducting a mutual authentication process using said first new secret key segment and said second default key segment and returning to said step of sending a second write command;

if said second acknowledgement signal is detected, then sending a second read command identifying said second memory page;

if no read data is detected in response to said second read command, then returning to said step of conducting a mutual authentication process using said first new secret key segment and said second default key segment;

if correct read data is detected in response to said second read command, then said base station associating said fixed ID of said key transponder with said first and second new secret key segments.

9. The base station of claim 8 wherein said controller is further programmed to perform the steps of:

sending said first new key segment to said key transponder in response to said first acknowledgement signal and prior to said first read command; and sending said second new key segment to said key transponder in response to said second acknowledgement signal and prior to said second read command.

10. The base station of claim 8 wherein said controller is further programmed to perform the step of:

if incorrect data is detected in response to said first read command, then returning to said step of sending said first write command.

11. The base station of claim 10 wherein said controller is further programmed to perform the step of:

if incorrect data is detected in response to said second read command, then returning to said step of sending said second write command.

12. The base station of claim 11 wherein communication between said base station and said key transponder is encrypted using rolling encryption after said mutual authentication process, and wherein said controller is further programmed to perform the steps of:

updating said rolling encryption prior to returning to said step of sending said first write command; and updating said rolling encryption prior to returning to said step of sending said second write command.

13. The base station of claim 8 wherein said controller is further programmed to perform the step of:

if incorrect data is detected in response to said first read command, then conducting a mutual authentication process using said first new secret key segment and said second default key segment before sending said second write command.

14. The base station of claim 8 wherein said controller is further programmed to perform the step of:

if incorrect data is detected in response to said second read command, then conducting a mutual authentication process using said first new secret key segment and said second new secret key segment and then returning to said step of sending said second write command.

15. A method of programming a secret key into a key transponder from a base station, wherein said key transponder stores a fixed ID, a first default key segment stored in a first memory page, and a second default key segment stored in a second memory page, and wherein said secret key comprises a first new secret key segment to be stored in said first memory page of said key transponder and a second new secret key segment to be stored in said second memory page of said key transponder, said method comprising the steps of:

conducting a mutual authentication process using a first default key segment and a second default key segment;

sending a first write command identifying said first memory page;

checking for a first acknowledgement signal from said key transponder;

if said first acknowledgement signal is not detected, then returning to said step of conducting a mutual authentication process using said first default key segment and said second default key segment;

if said first acknowledgement signal is detected, then sending a first read command identifying said first memory page;

if no read data is detected in response to said first read command, then returning to said step of conducting a mutual authentication process using said first default key segment and said second default key segment;

if any return data is detected in response to said first read command, then sending a second write command identifying said second memory page;

checking for a second acknowledgement signal from said key transponder;

if said second acknowledgement signal is not detected, then conducting a mutual authentication process using said first new secret key segment and said second default key segment and returning to said step of sending a second write command;

if said second acknowledgement signal is detected, then sending a second read command identifying said second memory page;

if no read data is detected in response to said second read command, then returning to said step of conducting a mutual authentication process using said first new secret key segment and said second default key segment;

if any return data is detected in response to said second read command, then conducting said mutual authentication process using said first and second new secret key segments and if successful then said base station associating said fixed ID of said key transponder with said first and second new secret key segments.

* * * * *